(No Model.)

I. C. HAWES.
NUT LOCK.

No. 438,922. Patented Oct. 21, 1890.

WITNESSES:
Fred G. Dieterich
M. D. Blondel

INVENTOR:
I. C. Hawes.
BY
ATTORNEYS

UNITED STATES PATENT OFFICE.

ITHAMAR C. HAWES, OF NEW MILFORD, CONNECTICUT.

NUT-LOCK.

SPECIFICATION forming part of Letters Patent No. 438,922, dated October 21, 1890.

Application filed December 31, 1889. Serial No. 335,492. (No model.)

*To all whom it may concern:*

Be it known that I, ITHAMAR C. HAWES, of New Milford, in the county of Litchfield and State of Connecticut, have invented a new and useful Improvement in Nut-Locks, of which the following is a full, clear, and exact description.

My invention relates to an improvement in nut-locks, and has for its object to provide an effective and simple means of locking a nut upon a bolt, and especially adapted for use in connection with vehicle-bolts and the bolts of agricultural implements.

A further object of the invention is to so construct the lock that, although the nut may be rigidly secured to the bolt, when found desirable the lock may be conveniently and expeditiously manipulated to admit of the nut being withdrawn from the bolt.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
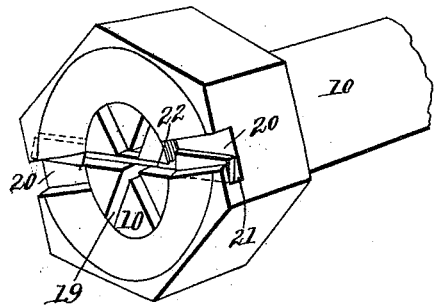
Figure 2:
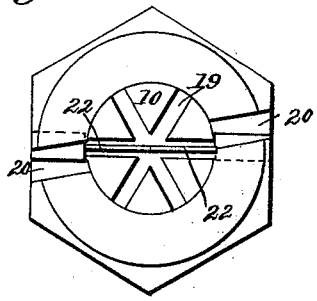

Figure 1 is a perspective view of a modification. Fig. 2 is a front view of the same.

In the form of the device illustrated, 10 is the bolt, in the extremity of the threaded end of which diametrical intersecting slots 19 are made. The nut is provided with diametrical recesses 20, located at opposite sides, the two recesses being in horizontal alignment, and the diagonally opposite side walls of said recesses are undercut, as illustrated at 21. Instead of a pawl being employed in connection with this form of the lock-nut, a key 22 is used, which key consists of a flat bar of metal having its wider sides at its ends at right angles to the wider sides of its central portion, and after the nut has been screwed to place upon the bolt the central portion of the key is dropped edgewise into one of the diametrical grooves or slots 19 of the bolt, whereupon the ends of the key enter the recesses 20 flatwise. After the key has been inserted in its place the nut is capable of but a slight movement upon the bolt, as the ends of the key enter the undercut portions of the recesses 20.

I desire it to be understood that a lock-nut constructed as described is very effective wherever such a device is needed—as, for instance, in connection with railroad-rails, bridges, and other structures and machinery.

Having thus described my invention, I claim as new and desire to secure by Letters Patent—

1. The combination, with a bolt having transverse intersecting grooves 19 across its threaded extremity, of a nut having recesses 20 in one face at opposite sides of and communicating with the bore or aperture to register with the said grooves, the diagonally-opposite walls of said recesses being undercut, and a key to be inserted in a groove 19 and recesses 20 when in register and adapted to be locked by turning the nut to bring the shoulders formed by said under-cuts over the ends of said key, substantially as set forth.

2. The combination, with the bolt 10, having transverse intersecting grooves 19 in its threaded extremity, of the nut having recesses 20 in one face at opposite sides of and communicating with its bore or aperture, the diagonally-opposite walls of said recesses being undercut, as shown at 21, and the flat key 22, having its ends in the same plane at right angles to its intermediate or body portion to pass into the recess 20 and under the said undercut walls, substantially as set forth.

ITHAMAR C. HAWES.

Witnesses:
ERNEST W. HANKE,
CONRAD L. ALTENBRANDT.